(12) United States Patent
Tsuru et al.

(10) Patent No.: US 10,597,792 B2
(45) Date of Patent: Mar. 24, 2020

(54) ELECTRICALLY CONDUCTIVE MATERIAL FOR CONNECTION COMPONENT

(71) Applicant: Kobe Steel, Ltd., Kobe-shi (JP)

(72) Inventors: Masahiro Tsuru, Shimonoseki (JP); Shinya Katsura, Shimonoseki (JP)

(73) Assignee: Kobe Steel, Ltd., Kobe-shi (JP)

(*) Notice: Subject to any disclaimer, the term of this patent is extended or adjusted under 35 U.S.C. 154(b) by 0 days.

(21) Appl. No.: 16/064,724

(22) PCT Filed: Jun. 21, 2016

(86) PCT No.: PCT/JP2016/088071
§ 371 (c)(1),
(2) Date: Jun. 21, 2018

(87) PCT Pub. No.: WO2017/110859
PCT Pub. Date: Jun. 29, 2017

(65) Prior Publication Data
US 2018/0371633 A1    Dec. 27, 2018

(30) Foreign Application Priority Data

Dec. 24, 2015   (JP) .................................. 2015-252617

(51) Int. Cl.
*B32B 15/01* (2006.01)
*C25D 3/30* (2006.01)
(Continued)

(52) U.S. Cl.
CPC ................ *C25D 5/12* (2013.01); *B32B 15/01* (2013.01); *C25D 3/30* (2013.01); *C25D 3/58* (2013.01);
(Continued)

(58) Field of Classification Search
CPC . C25D 5/12; C25D 5/50; C25D 5/505; C25D 3/30; C25D 3/58; C25D 7/00;
(Continued)

(56) References Cited

U.S. PATENT DOCUMENTS

| 8,445,057 B2 * | 5/2013 | Suzuki ...................... C23C 2/28 427/123 |
| 2009/0053553 A1 | 2/2009 | Masago et al. |
| 2013/0260174 A1 * | 10/2013 | Tsuru ..................... H01B 1/026 428/646 |

FOREIGN PATENT DOCUMENTS

| CN | 106795643 A | 5/2017 |
| EP | 3 187 627 A1 | 7/2017 |

(Continued)

OTHER PUBLICATIONS

International Preliminary Report on Patentability and Written Opinion dated Jul. 5, 2018 in PCT/JP2016/088071 (with English translation), 11 pages.

(Continued)

*Primary Examiner* — Daniel J. Schleis
*Assistant Examiner* — Kevin C T Li
(74) *Attorney, Agent, or Firm* — Oblon, McClelland, Maier & Neustadt, L.L.P.

(57) ABSTRACT

An electrically conductive material for a connection component that includes a Cu—Sn alloy coating layer in which a Cu content is 55 to 70 atomic % and has an average thickness of 0.1 to 3.0 μm, and a Sn coating layer having an average thickness of 0.2 to 5.0 μm, which are formed in this order on a surface of a base material made of a copper or copper alloy sheet strip. When a reflected electron image of a material surface is observed with a scanning electron microscope at a magnification of 100 times, a region A and a region B having a higher brightness than the region A and in which the Cu—Sn alloy coating layer is not exposed (Continued)

coexist on the material surface, and an area ratio of the region A on the material surface is 2 to 65%. Further, when the region A is observed with the scanning electron microscope at a magnification of 10,000 times, a region C covered with the Sn coating layer and a region D not covered with the Sn coating layer coexist in the region A, and the area ratio of the region C in the region A is 20 to 70%.

14 Claims, 6 Drawing Sheets

(51) Int. Cl.
    *C25D 3/58*    (2006.01)
    *C25D 5/12*    (2006.01)
    *C25D 7/00*    (2006.01)
    *H01R 13/03*    (2006.01)
    *C25D 5/50*    (2006.01)

(52) U.S. Cl.
    CPC .................. *C25D 5/50* (2013.01); *C25D 7/00* (2013.01); *H01R 13/03* (2013.01)

(58) Field of Classification Search
CPC ....... C25D 7/0614; B32B 33/00; B32B 15/01; H01R 13/03
See application file for complete search history.

(56) References Cited

FOREIGN PATENT DOCUMENTS

| | | |
|---|---|---|
| JP | 2004-68026 A | 3/2004 |
| JP | 2006-183068 A | 7/2006 |
| JP | 2009-52076 A | 3/2009 |

OTHER PUBLICATIONS

International Search Report dated Feb. 14, 2017 in PCT/JP2016/088071 filed Dec. 21, 2016.
Extended European Search Report dated Apr. 11, 2019 in European Patent Application No. 16878746.3, 8 pages.

* cited by examiner

ELECTRICALLY CONDUCTIVE MATERIAL FOR CONNECTION COMPONENT

TECHNICAL FIELD

The present invention relates to an electrically conductive material for a connection components, such as terminals and bus bars, that are used mainly for electrical wiring of automobiles, consumer appliances, and the like, and more particularly, an electrically conductive material for a connection component that is required to achieve both the reduction of an insertion force in fitting the terminal and the reliability of solder joint.

BACKGROUND ART

A terminal provided with a Sn layer (reflow Sn plating or the like) on the surface of a copper or a copper alloy base material is used as a fitting terminal used for connection of electrical wiring of automobiles and consumer appliances in order to secure corrosion resistance and reduce contact resistance at a contact part. When a male terminal and a female terminal, each having a Sn layer formed thereon, are fitted together, deformation resistance occurs due to plastic deformation of the soft Sn layer, and shear resistance occurs due to shearing of adhesion parts between Sn and Sn of the male terminal and the female terminal. Because of this, an insertion force of the terminal enough to overcome such deformation resistance and shear resistance is required. In recent years, with higher functionality and multifunctionality of electronic devices, the number of poles of a terminal used in a connector has increased. Along with this, the insertion force of the terminal has been becoming larger. From the viewpoint of reducing a load on an operator and preventing errors in fitting, it is necessary to reduce the insertion force of the fitting terminal.

Meanwhile, when a printed circuit board and a terminal are joined together by soldering, Pb-free solder has been used to comply with recent regulations on environmentally hazardous substances. However, the Pb-free solder has a melting point higher than conventional Sn—Pb-based solder and exhibits less wettability, leading to low joint reliability in the conventional Sn-plated terminals. For this reason, terminals with excellent solder wettability are needed.

Patent Document 1 describes an electrically conductive material for a connection component in which a coating layer formed of a Ni layer, a Cu—Sn alloy layer, and a Sn layer in this order is formed on a surface of copper or a copper alloy base material. By restricting a thickness of the Sn layer to 0.5 µm or less, the electrically conductive material for a connection component reduces a coefficient of friction and thereby can reduce the insertion force to a low level. Patent Document 2 describes an electrically conductive material for a connection component in which a coating layer formed of a Ni layer (if necessary), a Cu—Sn alloy layer, and a Sn layer in this order is formed on a surface of copper or a copper alloy base material that has a large surface roughness. The Cu—Sn alloy layer has a Cu content of 20 to 70 at %, and an average thickness of 0.2 to 3.0 µm, and the Sn layer has an average thickness of 0.2 to 5.0 µm. The surface of the electrically conductive material has an arithmetic mean roughness Ra in at least one direction of 1.5 µm or more, and an arithmetic mean roughness in all directions of 3.0 µm or less. Parts of the Cu—Sn alloy layer are exposed from the outermost Sn layer, and an exposed area ratio thereof is 3 to 75%. The electrically conductive material for a connection component has a low coefficient of friction and thereby can reduce the insertion force of the connector.

Patent Document 3 describes an electrically conductive material for a connection component in which a coating layer formed of a Ni layer (if necessary), a Cu—Sn alloy layer, and a Sn layer in this order is formed on a surface of copper or a copper alloy base material. The Cu—Sn alloy layer has an average thickness of 0.2 to 3.0 µm, and a glossy or semi-glossy Sn plating layer with a uniform thickness is formed as a part of the Sn layer, in the outermost layer. When viewing the cross section perpendicular to the material surface, the diameter [D1] of the minimum inscribed circle of the Sn layer is 0.2 µm or less, the diameter [D2] of the maximum inscribed circle of the Sn layer is 1.2 to 20 µm, and the height difference [y] between the outermost point of the material and the outermost point of the Cu—Sn alloy layer is 0.2 µm or less. The electrically conductive material for a connection component has a low coefficient of friction, can reduce the insertion force of the connector, and exhibits excellent solder wettability.

PRIOR ART DOCUMENT

Patent Document

Patent Document 1: JP 2004-68026 A
Patent Document 2: JP 2006-183068 A
Patent Document 3: JP 2009-52076 A Disclosure of the Invention Problems to be Solved by the Invention The electrically conductive material for a connection component mentioned in Patent Document 1 has a lower coefficient of dynamic friction than the conventional material and thereby can reduce the insertion force of the terminal, but is further required to have reduced coefficient of dynamic friction. In the electrically conductive material for a connection component mentioned in Patent Document 2, since parts of the Cu—Sn alloy layer are exposed on the surface thereof, the coefficient of dynamic friction thereof can be further reduced, as compared to the electrically conductive material for a connection component mentioned in Patent Document 1, but its solder wettability is degraded due to the Cu—Sn alloy layer exposed on the surface. The electrically conductive material for a connection component mentioned in Patent Document 3 has reduced coefficient of dynamic friction because the Sn layer has a thin part and has improved solder wettability because a uniform Sn plating layer is formed at the outermost layer. However, since a terminal has its entire surface covered with the Sn layer, when inserting the terminal, adhesion of Sn occurs, and, consequently, the effect of reducing the coefficient of dynamic friction becomes small.

It is an object of the present disclosure to provide an electrically conductive material for a connection component which can reduce an insertion force of a terminal because of its low coefficient of dynamic friction and can also have satisfactory solder wettability.

Means for Solving the Problems

An electrically conductive material for a connection component according to the present disclosure is characterized by comprising: coating layers including a Cu—Sn alloy coating layer and a Sn coating layer that are formed in sequence on a surface of a base material made of a copper or copper alloy sheet strip, wherein a Cu content in the Cu—Sn alloy coating layer is 55 to 70 at %, an average thickness of the Cu—Sn alloy coating layer is 0.1 to 3.0 μm, an average thickness of the Sn coating layer is 0.2 to 5.0 μm, and a material surface of the electrically conductive material has an arithmetic mean roughness Ra in at least one direction of 0.15 μm or more and an arithmetic mean roughness Ra in all directions of 3.0 μm or less, and wherein when a reflected electron image of the material surface is observed with a scanning electron microscope at a magnification of 100 times, a region A and a region B having a higher brightness than the region A and in which the Cu—Sn alloy coating layer is not exposed coexist on the material surface, and an area ratio of the region A on the material surface is 2 to 65%, and wherein when the region A is observed with the scanning electron microscope at a magnification of 10,000 times, a region C covered with the Sn coating layer and a region D not covered with the Sn coating layer coexist in the region A, and an area ratio of the region C in the region A is 20 to 70%.

In the above-mentioned electrically conductive material for a connection component, an average spacing between the regions A on the material surface is preferably 0.01 to 0.5 mm. In the electrically conductive material for a connection component, the thickness of the Cu—Sn alloy coating layer in the region A is preferably 0.2 μm or more. The electrically conductive material for a connection component preferably further comprises an underlayer disposed between the surface of the base material and the Cu—Sn alloy coating layer, the underlayer being made of one or two layers selected from a Ni coating layer, a Co coating layer, and a Fe coating layer, an average thickness (in use of two kinds of layers, the total thickness of them) of the underlayer being 0.1 to 3.0 μm.

The electrically conductive material for a connection component further may include a Cu coating layer disposed between the surface of the base material and the Cu—Sn alloy coating layer or between the underlayer and the Cu—Sn alloy coating layer.

Effects of the Invention

The electrically conductive material for a connection component according to the present disclosure has a low coefficient of dynamic friction and satisfactory solder wettability. Therefore, the electrically conductive material can provide a fitting-type terminal which has low insertion force and high reliability of solder joint, and a connector using the fitting-type terminal.

MODE FOR CARRYING OUT THE INVENTION

Figure 1A:
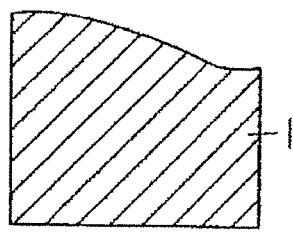
FIG. 1A is a schematic diagram showing an example of a method for manufacturing an electrically conductive material for a connection component according to an embodiment of the present invention.

An electrically conductive material for a connection component according to a embodiment of the present invention will be specifically described below.

(1) Cu Content in Cu—Sn Alloy Coating Layer

The Cu content in a Cu—Sn alloy coating layer is set to 55 to 70 at %, which is within the range mentioned in Patent Document 2. The Cu—Sn alloy coating layer having a Cu content of 55 to 70 at % is composed of an intermetallic compound that mainly contains a $Cu_6Sn_5$ phase. In the embodiment of the present invention, since the $Cu_6Sn_5$ phase partially protrudes on the surface of the Sn coating layer, the contact pressure can be received by the hard $Cu_6Sn_5$ phase when an electric contact part slides, so that a contact area between the Sn coating layers can be decreased, thereby reducing wear and oxidization of the Sn coating layers. Meanwhile, a $Cu_3Sn$ phase has a larger Cu content than the $Cu_6Sn_5$ phase. When the $Cu_3Sn$ phase is partially exposed on the surface of the Sn coating layer, the amount of Cu oxides and the like generated on the material surface over time and due to corrosion or the like becomes large, which easily tends to increase a contact resistance, making it difficult to maintain a reliability of electric connection.

Furthermore, the $Cu_3Sn$ phase has a problem of inferior formability of the material and the like because the $Cu_3Sn$ phase is brittle, compared to the $Cu_6Sn_5$ phase. When the whole Cu—Sn alloy coating layer is composed of the $Cu_6Sn_5$ phase, the Cu content in the Cu—Sn alloy coating layer is 55 at %. The Cu—Sn alloy coating layer may partially contain a $Cu_3Sn$ phase, and may contain a constituent element in the base material or Sn plating, and the like. The Cu content exceeding 70 at % makes it difficult to maintain the reliability of the electric connection over time and due to corrosion or the like, and deteriorates the formability and the like. Thus, the Cu content in the Cu—Sn alloy coating layer is specified to be 55 to 70 at %. The upper limit of the Cu content in the Cu—Sn alloy coating layer is preferably 65 at %.

(2) Average Thickness of Cu—Sn Alloy Coating Layer

The average thickness of the Cu—Sn alloy coating layer is set to 0.1 to 3.0 µm, which is substantially the same as the average thickness in the electrically conductive material for a connection component mentioned in Patent Document 2. In the embodiment of the present invention, the average thickness of the Cu—Sn alloy coating layer is defined as a value obtained by dividing an area density (unit: $g/mm^2$) of Sn contained in the Cu—Sn alloy coating layer by a density (unit: $g/mm^3$) of the Sn contained therein. A measurement method for an average thickness of the Cu—Sn alloy coating layer mentioned in the examples below is in conformity with this definition. If the average thickness of the Cu—Sn alloy coating layer is less than 0.1 µm, when the Cu—Sn alloy coating layer is partially exposed on the material surface as in the embodiment of the present invention, the large amount of Cu oxides is generated on the material surface by thermal diffusion, such as high-temperature oxidation. If the amount of Cu oxides on the material surface becomes large, the contact resistance tends to easily increase, making it difficult to maintain the reliability of the electric connection. Meanwhile, if the average thickness of the Cu—Sn alloy coating layer exceeds 3.0 µm, the electrically conductive material becomes disadvantageous economically and has insufficient productivity and unsatisfactory formability because the hard layer is formed thick. Therefore, the average thickness of the Cu—Sn alloy coating layer is specified to be 0.1 to 3.0 µm. The lower limit of the average thickness of the Cu—Sn alloy coating layer is preferably 0.3 µm, and the upper limit thereof is preferably 1.0 µm.

(3) Average Thickness of Sn Coating Layer

The average thickness of the Sn coating layer is set to 0.2 to 5.0 µm, which is substantially the same as the average thickness of the electrically conductive material for a connection component mentioned in Patent Document 2. In the embodiment of the present invention, the average thickness of the Sn coating layer is defined as a value obtained by dividing an area density (unit: $g/mm^2$) of Sn contained in the Sn coating layer by a density (unit: $g/mm^3$) of the Sn contained therein. A measurement method for an average thickness of the Sn coating layer mentioned in Examples below is in conformity with this definition. If the average thickness of the Sn coating layer is less than 0.2 µm, as mentioned in Patent Document 2, the amount of Cu oxides on the material surface becomes larger due to thermal diffusion, such as high-temperature oxidation, which easily leads to an increase in the contact resistance, and deteriorates a corrosion resistance of the electrically conductive material. In addition, a solder wettability becomes difficult to secure. Meanwhile, if the average thickness of the Sn coating layer exceeds 5.0 µm, the coefficient of friction of the electrically conductive material increases due to an adhesion of Sn. Furthermore, it is economically disadvantageous and the productivity thereof deteriorates. Thus, the average thickness of the Sn coating layer is specified to be 0.2 to 5.0 µm.

When the Sn coating layer is made of a Sn alloy, constituent elements of the Sn alloy other than Sn include Pb, Bi, Zn, Ag, Cu, and the like. The Pb content is preferably less than 50% by mass, and the content of each of the other elements is preferably less than 10% by mass.

(4) Arithmetic Mean Roughness Ra of Material Surface

An arithmetic mean roughness Ra of the material surface is 0.15 µm or more in at least one direction and 3.0 µm or less in all directions. If the arithmetic mean roughness Ra is less than 0.15 µm in all directions, the height of a protrusion of the Cu—Sn alloy coating layer is low as a whole, and the ratio of a contact pressure received by the hard $Cu_6Sn_5$ phase to the total contact pressure exerted at the electric contact part becomes smaller during sliding and fine sliding of the electric contact part, which makes it difficult to reduce the amount of wear of the Sn-coating layer, especially, due to the fine sliding. Meanwhile, if an arithmetic mean roughness Ra of the material surface in any direction exceeds 3.0 µm, the amount of Cu oxides on the material surface becomes larger due to thermal diffusion, such as high-temperature oxidation, which easily leads to an increase in the contact resistance, and deteriorates the corrosion resistance of the material. This makes it difficult to maintain the reliability of electric connection. Thus, the arithmetic mean roughness Ra of the material surface is specified to be 0.15 µm or more in at least one direction and 3.0 µm or less in all directions. The arithmetic mean roughness Ra of the material surface is preferably 0.2 µm or more in at least one direction and 2.0 µm or less in all directions.

(5) Area Ratio of Region A

When observing a reflected electron image of the material surface with a scanning electron microscope at a magnification of 100 times, a large number of dark gray parts and light gray parts is shown to coexist. The dark gray part is a region in which a part covered with the Sn coating layer and a part not covered with the Sn coating layer and with the Cu—Sn alloy coating layer exposed thereat (the exposed form thereof will be mentioned later) coexist, and this region will be referred to as region A in the embodiment of the present invention. The light gray part is the region where the Cu—Sn alloy coating layer is not exposed (where the Sn coating layer is covered), and this region will be referred to as a region B in the embodiment of the present invention. The area ratio of the region A is set to 2 to 65%. The term "area ratio of the region A" as used herein means the ratio (in units of percent) of the area of the region A to the total observed range area (the area of the region A+the area of the region B). The area ratio of the region A generally corresponds to an "exposure area ratio of the Cu—Sn alloy coating layer on the material surface" mentioned in Patent Document 2.

In other words, the dark gray part (region A) has low brightness, and the light gray part (region B) has high brightness. The larger the atomic number of an element present on the material surface observed, the higher the brightness in the reflected electron image becomes. Thus, the part where Sn is present has high brightness (i.e., appears whitish), compared to that of Cu which has a smaller atomic number than Sn. As the entire region B is covered with the Sn coating layer, the area ratio covered with Sn is substantially 100%. Meanwhile, since in the region A, the Sn coating layer and the Cu—Sn alloy coating layer coexist, the area ratio covered with Sn is lower than the area ratio in the region B. Consequently, the brightness of the region B is higher than the brightness of the region A. Thus, the region A and the region B can be distinguished as regions having different brightnesses in the reflected electron image. Here, the area ratio of Sn can vary among a plurality of regions A. Thus, all the regions A do not necessarily have the same brightness, and the respective regions A can have different brightness in some cases. However, a difference in the brightness between one region A and the other region A is small, whereas a difference in the brightness between the region A and the region B is large. Thus, a person skilled in the art can surely distinguish between the region A and the region B even if there is a variation in the brightness between the regions A.

When the area ratio of the region A is less than 2% (the area ratio of the region B is 98% or more), the adhesion amount between the Sn coating layers increases, and thereby the coefficient of dynamic friction also increases. Meanwhile, when the area ratio of the region A exceeds 65% (the area ratio of the region B is less than 35%), the area of the Cu—Sn alloy coating layer not covered with the Sn coating layer increases, which cannot secure the solder wettability. In addition, the amount of Cu oxides on the material surface becomes large over time and due to corrosion or the like, so that the contact resistance tends to easily increase, making it difficult to maintain the reliability of the electric connection. Therefore, the area ratio of the region A is specified to be 2 to 65%.

(6) Area Ratio of Region C

When the region A, in which a part covered with the Sn coating layer and an exposed part of the Cu—Sn alloy coating layer not covered with the Sn coating layer coexist, is observed with a scanning electron microscope at a magnification of 10,000 times, a great number of gray parts and white parts are observed to coexist. The white part is a region where the Cu—Sn alloy coating layer is covered with the Sn coating layer, and this region will be referred to as a region C in the embodiment of the present invention. The gray part is a region where the Cu—Sn alloy coating layer is not covered with the Sn coating layer, and this region will be referred to as a region D in the embodiment of the present invention. In this way, when observing the reflected electron image at a magnification of 10,000 times, even the region A, which does not seem to be covered with the Sn coating layer in the reflected electron image at a magnification of 100 times, also includes the region C covered with the Sn coating layer (without any Cu—Sn alloy layer exposed) in some cases. With such a specific structure of the surface coating layer, the electrically conductive material according to the embodiment of the present invention has a low coefficient of dynamic friction and satisfactory solder wettability.

It is noted that the region C is a coated region that is coated with the Sn coating layer in the same manner as the region B mentioned above, but the area of the region C is much smaller than the area of the region B. The region C cannot be distinguished from the region D with the scanning electron microscope at a magnification of 100 times, and is the coated region having such a small area (e.g., 0.05 $\mu m^2$ to 30 $\mu m^2$) that can be distinguished from the region D at a magnification of 10,000 times. Meanwhile, the region B is a covered region having a large area (e.g., more than 30 $\mu m^2$, mainly 500 $\mu m^2$ or more, typically 1400 $\mu m^2$ or more) that can be distinguished from other regions (e.g., the region A) with the scanning electron microscope at a magnification of 100 times.

The area ratio of the region C is set to 20 to 70%. The term "area ratio of the region C" as used herein means a ratio (in units of percent) of the area of the region C in the total observed range area of the region A (the area of the region C+the area of the region D). The observed range of the region A is set to observe only the region A and not to observe the region B. If an area ratio of the region C is less than 20%, the ratio of the Cu—Sn alloy coating layer exposed on the surface to the total observed range is large, reducing the solder wettability of the electrically conductive material. Meanwhile, if the area ratio of the region C exceeds 70%, the adhesion amount between the Sn coating layers increases, and thereby the coefficient of dynamic friction also increases.

(7) Average Spacing Between Regions A

An average spacing between the adjacent regions A (more precisely, an average of the sums of the average widths of the region A and of the adjacent region B) is preferably set to 0.01 to 0.5 mm in at least one direction. The spacing corresponds to a mean exposed spacing on the material surface in the electrically conductive material for a connection component as mentioned in Patent Document 2. The average spacing between the adjacent regions A as used herein is defined as the average sum of an average width of the region A across a straight line drawn on the material surface (length along the above-mentioned straight line) and an average width of the adjacent region B. As the regions A and the regions B coexist more finely, the average spacing between the adjacent regions A becomes smaller. The term "average spacing between the adjacent regions A" generally corresponds to the "exposed spacing on the material surface" mentioned in Patent Document 2.

If the average spacing between the adjacent regions A is less than 0.01 mm, the amount of Cu oxides and the like on the material surface becomes large over time and due to corrosion or the like, so that the contact resistance tends to easily increase, making it difficult to maintain the reliability of the electric connection. Meanwhile, if the average spacing between the adjacent regions A exceeds 0.5 mm, especially when applied to a small-sized terminal, the electrically conductive material has difficulty in obtaining a low coefficient of friction in some cases. In general, as the terminal becomes smaller, the contact area between electric contact parts (insertion/removal parts), such as an indent and a rib, becomes smaller. Thus, at the time of insertion and removal of the electric contact part, the contact probability only between the Sn coating layers increases. Consequently, the adhesion amount between the Sn coating layers increases, making it difficult to obtain a low coefficient of friction. Therefore, the average spacing between the adjacent regions A is preferably 0.01 to 0.5 mm in at least one direction. The average spacing between the adjacent regions A is more preferably 0.01 to 0.5 mm in all directions. Thus, the contact probability only between the Sn coating layers is reduced at the time of insertion and removal of the electric contact part. Preferably, the lower limit of the average spacing between the adjacent regions A is 0.05 mm, while the upper limit thereof is 0.3 mm.

(8) Thickness of Cu—Sn Alloy Coating Layer in Region A

In the electrically conductive material for a connection component according to the embodiment of the present invention, the thickness of the Cu—Sn alloy coating layer in the region A is preferably set to 0.2 $\mu m$ or more, which is substantially the same as that in the electrically conductive material for a connection component mentioned in Patent Document 2. This is because parts of the Cu—Sn alloy coating layer are exposed on the material surface in the region A, and in such a case, the thickness of the exposed part of the Cu—Sn alloy coating layer could become extremely thin depending on the manufacturing conditions, as compared to the average thickness of the Cu—Sn alloy coating layer. Here, the thickness of the Cu—Sn alloy coating layer in the region A is defined as a value measured by observing the cross section thereof (which is different from the method for measuring an average thickness of the Cu—Sn alloy coating layer). The thickness of the Cu—Sn alloy coating layer in the region A generally corresponds to the "thickness of the Cu—Sn alloy coating layer exposed on the surface of the Sn coating layer" mentioned in Patent Document 2.

If the thickness of the Cu—Sn alloy coating layer in the region A is less than 0.2 µm, the amount of Cu oxides and the like on the material surface becomes large over time and due to corrosion or the like, so that the contact resistance tends to easily increase, making it difficult to maintain the reliability of the electric connection. Therefore, the thickness of the Cu—Sn alloy coating layer in the region A is preferably 0.2 µm or more, and more preferably 0.3 µm or more.

(9) Coating Underlayer

The electrically conductive material for a connection component according to the embodiment of the present invention has an underlayer made of one or two layers selected from a Ni coating layer, a Co coating layer, and an Fe coating layer, if necessary. The average thickness of the underlayer (in the case of two types of layers, the total thickness thereof) is set to 0.1 to 3.0 µm. The underlayer has effects of suppressing the growth of the Cu—Sn alloy coating layer by suppressing the diffusion of base material constituent elements into the material surface to prevent the consumption of the Sn coating layer, and suppressing an increase in the contact resistance after use for a long time at a high temperature. However, if the average thickness of the underlayer is less than 0.1 µm, the above-mentioned effects cannot be sufficiently exhibited due to an increase in the amount of plating defects, such as pinholes, in the underlayer. Meanwhile, if the underlayer is thickened to some extent, the above-mentioned effects are saturated, and if the underlayer is too thick, the productivity and economic efficiency are deteriorated. Furthermore, the thickened underlayer causes cracks in a bending process, reducing the formability of the electrically conductive material into terminals. Therefore, the average thickness of the underlayer is set to 0.1 to 3.0 µm. Preferably, the lower limit of the average thickness of the underlayer is 0.2 µm, while the upper limit thereof is 2.0 µm.

(10) Cu Coating Layer

When the electrically conductive material for a connection component according to the embodiment of the present invention does not have the above-mentioned coating underlayer, a Cu coating layer may be provided between the surface of a base material and the Cu—Sn alloy coating layer. The Cu coating layer is a residual Cu plating layer left behind after a reflow treatment. The Cu coating layer has the function of suppressing the diffusion of Zn and/or other base material constituent elements into the material surface, thereby improving the solderability of the electrically conductive material for a connection component. If the Cu coating layer becomes too thick, the formability or the like of the electrically conductive material is degraded, and the economic efficiency thereof deteriorates. Thus, the average thickness of the Cu coating layer is preferably 3.0 µm or less.

When the electrically conductive material for a connection component according to the embodiment of the present invention has the above-mentioned coating underlayer, a Cu coating layer may be provided between the coating underlayer and the Cu—Sn alloy coating layer. The Cu coating layer, together with the Cu—Sn alloy coating layer, has a function of suppressing the diffusion of constituent elements of the above-mentioned coating underlayer itself into the material surface. Also, the Cu coating layer in this case is a residual Cu plating layer left behind after the reflow treatment, and the average thickness thereof is preferably 3.0 µm or less.

(11) Manufacturing Method

A method for manufacturing an electrically conductive material for a connection component according to the embodiment of the present invention will be specifically described below with reference to FIGS. 1 to 3.

(11-1) Method for Performing Sn Plating after a Reflow Treatment

This method involves roughening the surface of a base material, then performing base plating, such as Ni plating (if necessary), Cu plating, and Sn plating on the base material surface in this order, followed by a reflow treatment, and subsequently performing electric Sn plating. Respective steps in the method will be described with reference to FIGS. 1A to 1D.

FIG. 1A shows a base material 1 having its surface subjected to a roughening treatment. Methods usable for roughening the surface of the base material 1 may include rolling (using a work roll whose surface is roughened by polishing, shot blasting, or the like), and polishing. Regarding the surface roughness of the base material, preferably, an arithmetic mean roughness Ra in at least one direction is 0.3 µm or more, an arithmetic mean roughness in all directions is 4.0 µm or less, and a mean spacing Sm of the asperities calculated in the above-mentioned one direction is 0.01 to 0.5 mm. The surface roughness of the base material is more preferably 0.4 µm or more in at least one direction and the 3.0 µm or less in all directions. The surface roughness is the same as the numerical value mentioned in Patent Document 2.

Figure 1B:
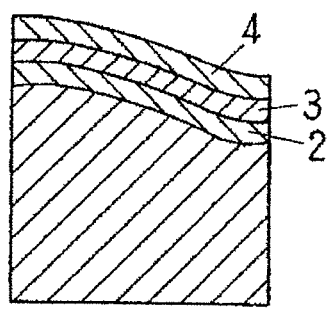
FIG. 1B is a schematic diagram showing the example of the method for manufacturing an electrically conductive material for a connection component according to the embodiment of the present invention.
Figure 1C:
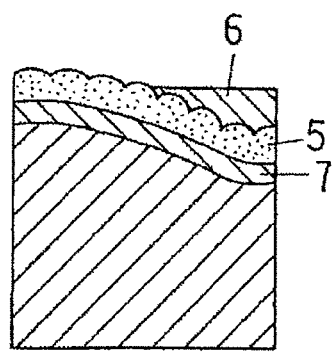
FIG. 1C is a schematic diagram showing the example of the method for manufacturing an electrically conductive material for a connection component according to the embodiment of the present invention.

FIG. 1B shows materials after the Ni plating, the Cu plating, and the Sn plating. A Ni plating layer 2, a Cu plating layer 3, and a Sn plating layer 4 are formed on the surface of the base material 1. When the reflow treatment is applied to these materials, as shown in FIG. 1C, Cu in the Cu plating layer 3 and Sn in the Sn plating layer 4 are mutually diffused to form a Cu—Sn alloy coating layer 5, and the Cu plating layer 3 disappears while a part of the Sn plating layer 4 remains to form a Sn coating layer 6. Parts of the Cu—Sn alloy coating layer 5 are exposed on the surface of the Sn coating layer 6. It is noted that the thickness of the Ni plating layer 2 does not change significantly after the reflow treatment (a Ni coating layer 7 is defined as the Ni plating layer obtained after the reflow treatment).

The conditions for the reflow treatment are a temperature from a melting point of the Sn plating layer to 600° C. for 3 to 30 seconds. The atmosphere in a furnace for the reflow treatment is, for example, an atmospheric air or a $N_2+O_2$ atmosphere, in which an oxygen concentration is set to 10 to 5%. Under the atmosphere in the furnace, the material surface is oxidized, and in particular, the exposed surface of the Cu—Sn alloy coating layer 5 is more likely to be oxidized. In the material obtained after the reflow treatment, an oxide film of 10 to 40 Å in thickness is preferably formed on the exposed surface of the Cu—Sn alloy coating layer 5.

Figure 1D:
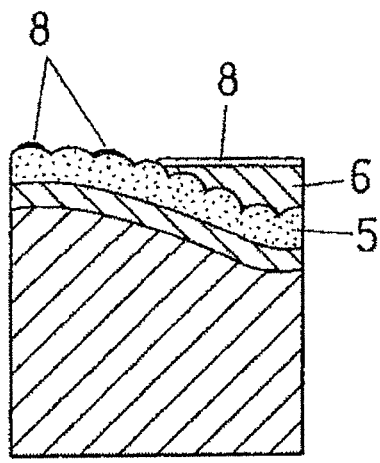
FIG. 1D is a schematic diagram showing the example of the method for manufacturing an electrically conductive material for a connection component according to the embodiment of the present invention.

Subsequently, Sn glossy electroplating is applied to the material surface. Since the oxide film is formed on the exposed surface of the Cu—Sn alloy coating layer 5, as shown in FIG. 1D, the Sn plating layer 8 is formed substantially uniformly in the layer shape on the Sn coating layer 6. However, the Sn plating layer 8 is not formed uniformly on the surface of the Cu—Sn alloy coating layer 5 and is formed in a state of being distributed in the island shape. As the oxide film formed on the exposed surface of the Cu—Sn alloy coating layer 5 is thicker, the Sn plating layer 8 is less likely to be formed on the surface of the Cu—Sn alloy coating layer 5. As a result, the region C and the region D coexist within the region A. The region occupied by the Cu—Sn alloy coating layer 5 exposed on the material surface (see FIG. 1C) after the reflow treatment corresponds to the above-mentioned region A. The region occupied by the Sn plating layer 8 distributed above the Cu—Sn alloy coating layer 5 in the island shape, on the material surface after glossy electroplating (see FIG. 1D), corresponds to the above-mentioned region C. The Sn plating layer 8 is also a part of the Sn coating layer in the present disclosure.

(11-2) Method for Controlling the Amount of Heat in the Reflow Treatment

This method involves roughening the surface of a base material, then performing base plating, such as Ni plating (if necessary), Cu plating, and Sn plating on the base material surface in this order, followed by the reflow treatment in which the amount of heat applied to the material is controlled to obtain a predetermined coating layer structure. The atmosphere in the furnace for the reflow treatment is not particularly limited. Respective steps in the method will be described with reference to FIGS. 2A to 2C.

Figure 2A:
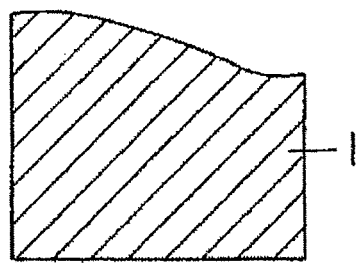
FIG. 2A is a schematic diagram showing another example of the method for manufacturing an electrically conductive material for a connection component according to the embodiment of the present invention.
Figure 2B:
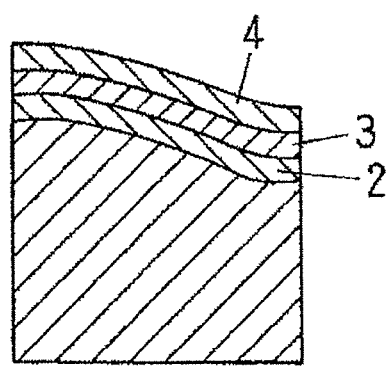
FIG. 2B is a schematic diagram showing another example of the method for manufacturing an electrically conductive material for a connection component according to the embodiment of the present invention.
Figure 2C:
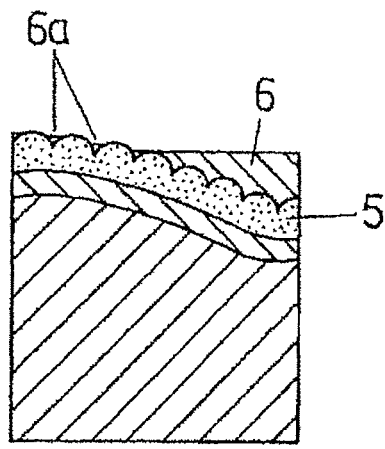
FIG. 2C is a schematic diagram showing another example of the method for manufacturing an electrically conductive material for a connection component according to the embodiment of the present invention.

As shown in FIGS. 2A and 2B, after performing the Ni plating, Cu plating, and Sn plating on the roughened surface of the base material, the reflow treatment is applied thereto. In the reflow treatment, the amount of heat applied to the material (temperature×time) is controlled to finely leave the Sn coating layer (denoted by 6a) in the island shape on the surface of the exposed Cu—Sn alloy coating layer 5. More specifically, as shown in FIG. 2C, the reflow treatment is finished after parts of the Cu—Sn alloy coating layer 5 are exposed on the material surface, and before Sn in fine concave portions (grain boundary triple points of a columnar crystal, or the like) scattered on the exposed surface of the Cu—Sn alloy coating layer 5 is consumed and disappears. The region occupied by the Cu—Sn alloy coating layer 5 exposed on the surface and the Sn coating layer 6a corresponds to the region A, and among these, the region occupied by the Sn coating layer 6a corresponds to the region C.

(11-3) Method for Removing Part of Molten Sn after Reflow Treatment

This method involves roughening the surface of a base material, then performing base plating, such as Ni plating (if necessary), Cu plating, and Sn plating on the base material surface in this order, followed by a reflow treatment, and mechanically removing parts of the Sn coating layer. Respective steps in the method will be described with reference to FIGS. 3A to 3D.

Figure 3A:
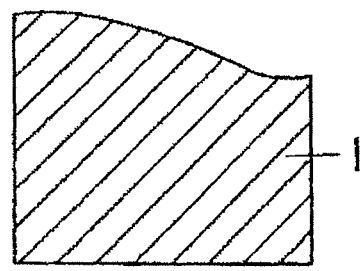
FIG. 3A is a schematic diagram showing a further example of the method for manufacturing an electrically conductive material for a connection component according to the embodiment of the present invention.
Figure 3B:
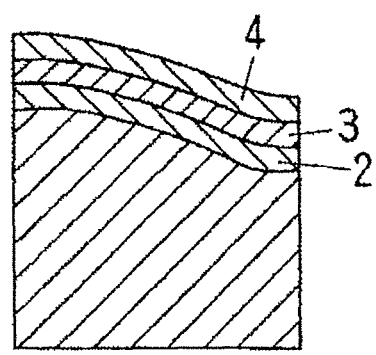
FIG. 3B is a schematic diagram showing the further example of the method for manufacturing an electrically conductive material for a connection component according to the embodiment of the present invention.
Figure 3C:
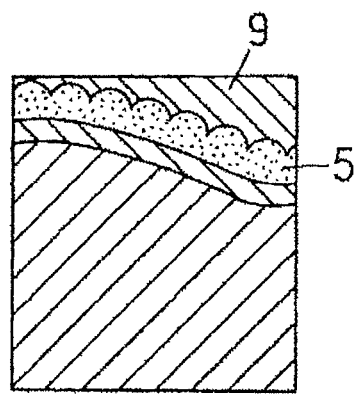
FIG. 3C is a schematic diagram showing the further example of the method for manufacturing an electrically conductive material for a connection component according to the embodiment of the present invention.
Figure 3D:
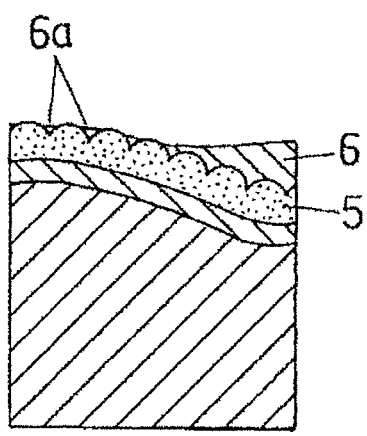
FIG. 3D is a schematic diagram showing the further example of the method for manufacturing an electrically conductive material for a connection component according to the embodiment of the present invention.

As shown in FIGS. 3A and 3B, after performing the Ni plating, Cu plating, and Sn plating on the roughened surface of the base material, the reflow treatment is applied thereto. As shown in FIG. 3C, in the material obtained immediately after the reflow treatment, the entire surface of the Cu—Sn alloy coating layer 5 is thinly covered with a molten Sn layer 9. Subsequently, parts of the molten Sn layer 9 are mechanically removed thinly to expose parts of the Cu—Sn alloy coating layer 5 on the material surface. In this state, the molten Sn is solidified. The molten Sn layer 9 becomes the Sn coating layer 6, whereby, as shown in FIG. 3D, the Sn coating layer (denoted by 6a) remains in fine concave portions (grain boundary triple points of a columnar crystal, or the like) scattered on the exposed surface of the Cu—Sn alloy coating layer 5. The region occupied by the Cu—Sn alloy coating layer 5 exposed on the surface and the Sn coating layer 6a corresponds to the region A, and the region occupied by the Sn coating layer 6a corresponds to the region C.

EXAMPLES

A Cu—Fe—P-based copper alloy used as a base material was subjected to a surface roughening treatment by a mechanical method (rolling or polishing) and was then finished into a copper alloy base material (sheet strip material) with a thickness of 0.64 mm and a predetermined roughness. Regarding the surface roughness of the base material after the surface roughening treatment, an arithmetic mean roughness Ra of the base material was set in a range of 0.3 to 4.0 μm, and a mean spacing Sm of the asperities was set to 0.01 to 0.5 mm. A method for measuring the surface roughness of the base material was the same as a method for measuring the surface roughness of the material surface after the Sn glossy electroplating (to be mentioned later).

Subsequently, base plating (Ni plating, Co plating, Fe plating), Cu plating, and Sn plating were performed in this order on the base material, and then the reflow treatment was performed under various conditions shown in Table 1 by setting the atmosphere in the reflow furnace to $N_2+O_2$ to control the $O_2$ concentration. Thereafter, Sn glossy electroplating was performed on the material surface after the reflow treatment (excluding test materials Nos. 10, 14, and 15).

For the obtained test materials, the average thickness of each coating layer, the Cu content in the Cu—Sn alloy coating layer, the exposed area ratio of the Cu—Sn alloy coating layer (area ratio of the region A), the Sn coating ratio of the Cu—Sn alloy coating layer (area ratio of the region C), the thickness of the Cu—Sn alloy coating layer exposed on the surface, the exposed surface spacing of the Cu—Sn alloy coating layer (average spacing between the adjacent regions A), and the material surface roughness were measured as follows. The measurement results are shown in Table 1.

(Method for Measuring Average Thickness of Ni Coating Layer)

The average thickness of the Ni coating layer after the reflow treatment was measured using a fluorescent X-ray film thickness meter (trade name: SFT3200, manufactured by Seiko Instruments, Co., Ltd.). As the measurement conditions, a two-layer calibration curve of Sn/Ni/base material was used as the calibration curve, and the collimator diameter was set to ϕ0.5 mm.

(Method for Measuring Average Thickness of Co Coating Layer)

The average thickness of the Co coating layer after the reflow treatment was measured using a fluorescent X-ray film thickness meter (trade name: SFT3200, manufactured by Seiko Instruments, Co., Ltd.). As the measurement conditions, a two-layer calibration curve of Sn/Co/base material was used as the calibration curve, and the collimator diameter was set to ϕ0.5 mm.

(Method for Measuring Average Thickness of Fe Coating Layer)

The average thickness of the Fe coating layer after the reflow treatment was measured using a fluorescent X-ray film thickness meter (trade name: SFT3200, manufactured by Seiko Instruments, Co., Ltd.). As the measurement conditions, a two-layer calibration curve of Sn/Fe/base material was used as the calibration curve, and the collimator diameter was set to ϕ0.5 mm.

(Method for Measuring Average Thickness of Cu—Sn Alloy Coating Layer)

First, each test material was immersed in an aqueous solution that contained p-nitrophenol and caustic soda as components for 10 minutes to remove the Sn coating layer. Then, the content of the Sn component contained in the Cu—Sn alloy coating layer of the test material was converted into and measured as the film thickness using a fluorescent X-ray film thickness meter (trade name: SFT3200, manufactured by Seiko Instruments, Co., Ltd.). As the measurement conditions, a single-layer calibration curve or a two-layer calibration curve of Sn/base material was used as the calibration curve, and the collimator diameter was set to ϕ0.5 mm. The obtained value was calculated into and defined as an average thickness of the Cu—Sn alloy coating layer.

(Method for Measuring Average Thickness of Sn Coating Layer)

First, the sum of the film thickness of the Sn coating layer of the test material and the film thickness of the Sn component contained in the Cu—Sn alloy coating layer thereof was measured using a fluorescent X-ray film thickness meter (trade name: SFT3200, manufactured by Seiko Instruments Co., Ltd.). Thereafter, the test material was immersed in an aqueous solution containing p-nitrophenol and caustic soda for 10 minutes to remove the Sn coating layer. Then, the content of the Sn component contained in the Cu—Sn alloy coating layer of the test material was again converted into and measured as the film thickness using the fluorescent X-ray film thickness meter. As the measurement conditions, a single-layer calibration curve or a two-layer calibration curve of Sn/base material was used as the calibration curve, and the collimator diameter was set to ϕ0.5 mm. The average thickness of the Sn coating layer was calculated by subtracting the thickness of the Sn component contained in the Cu—Sn alloy coating layer from the sum of the obtained thickness of the Sn coating layer and the thickness of the Sn component contained in the Cu—Sn alloy coating layer.

(Method for Measuring Cu Content in Cu—Sn Alloy Coating Layer)

First, each test material was immersed in an aqueous solution that contained p-nitrophenol and caustic soda as components for 10 minutes to remove the Sn coating layer. Then, the Cu content of the Cu—Sn alloy coating layer was determined by quantitative analysis using an EDX (energy dispersive X-ray spectrometer).

(Method for Measuring Surface Roughness)

The surface roughness was measured based on JIS B0601-1994 using a contact-type surface roughness meter (trade named: Surfcom 1400, manufactured by Tokyo Precision Co., Ltd.). The surface roughness measurement conditions were set as follows: a cut-off value of 0.8 mm; a reference length of 0.8 mm; an evaluation length of 4.0 mm; a measurement speed of 0.3 mm/s; and a stylus tip radius of 5 μmR. The measurement direction of the surface roughness was set to a direction (the direction at which the surface roughness becomes the largest) perpendicular to the rolling or polishing direction at which the surface roughening treatment was performed.

(Method for Measuring Area Ratio of Region A)

Figure 4:
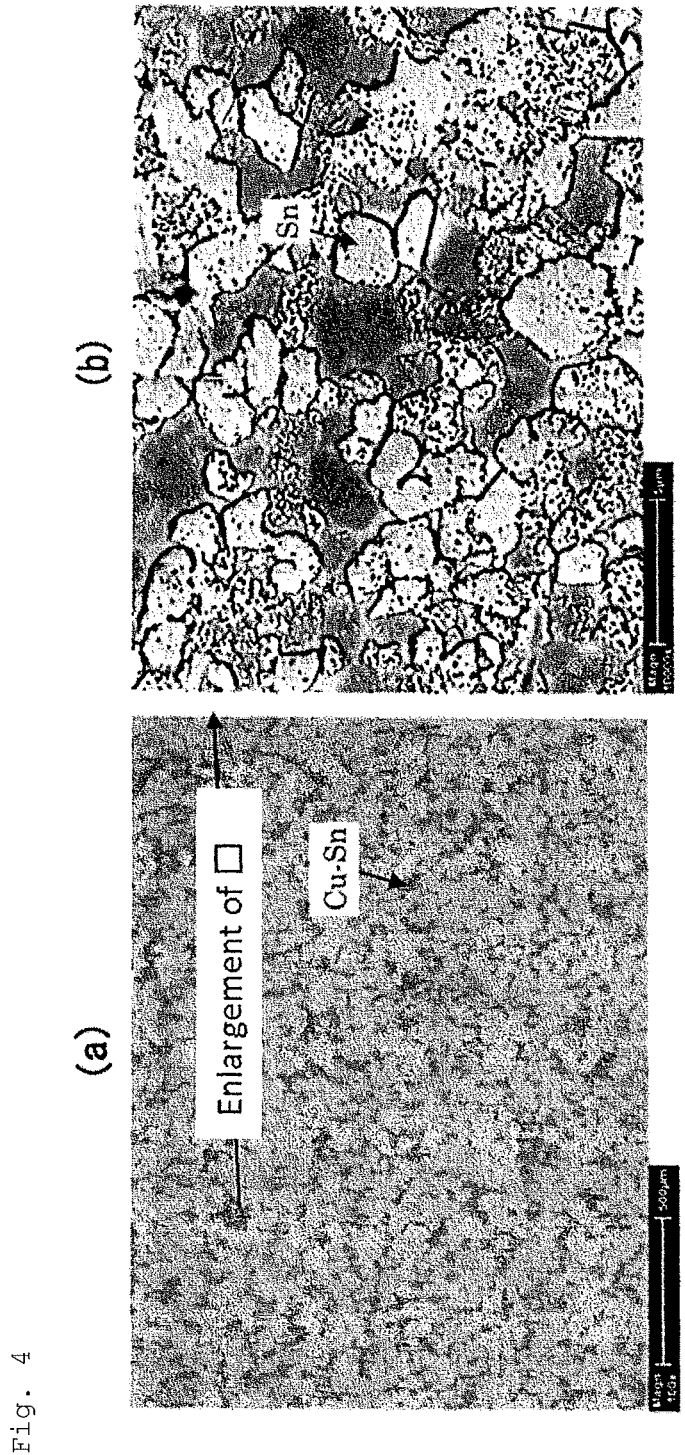
FIG. 4(a) shows a reflected electron image obtained when a surface of a test material in Example No. 1 was observed with a scanning electron microscope at a magnification of 100 times.
FIG. 4(b) shows a reflected electron image obtained when region A (area surrounded by □) in FIG. 4(a) was observed with the scanning electron microscope at a magnification of 10,000 times.

The surface of the test material was observed at a magnification of 100 times using an SEM (scanning electron microscope) equipped with an EDX (energy dispersive X-ray spectroscopic analyzer). FIG. 4A shows an example of a reflected electron composition image observed at a magnification of 100 times (Example No. 1). Then, the obtained reflected electron composition image was binarized using image analysis software (ImageJ1.49 of free software), thereby calculating the area ratio of the region A (region (dark gray part) where a part (region C) covered with the Sn coating layer and a part (region D) with the Cu—Sn alloy coating layer exposed thereon coexisted) by image analysis. In binarizing the reflected electron composition image, a reflected electron composition image before the binarization and an image after the binarization were compared with each other, and an optimum threshold value was determined for each of the reflected electron composition images of the test materials of Examples No. 1 to No. 15 such that both images visually matched each other the most.

(Method for Measuring Area Ratio of Region C)

In the SEM observation when measuring the area ratio of the region A, parts determined to belong to the region A (region in which a part (region C) covered with the Sn coating layer and a part (region D) with the Cu—Sn alloy coating layer exposed thereon coexist) were observed at a magnification of 10,000 times. FIG. 4B shows a reflected electron composition image obtained by enlarging and observing a range surrounded by □ in FIG. 4A at a magnification of 10,000 times. Then, the obtained reflected electron composition image was binarized using image analysis software (ImageJ1. 49 of free software), thereby calculating the area ratio of the region C (region (white part) having its outermost surface covered with the Sn coating layer) by image analysis. It is noted that all or most of the surface of the region C is covered with the Sn coating layer by Sn glossy electroplating, and in some cases, a very small part of the surface of the region C is covered with the Sn coating layer remaining after the reflow treatment. In binarizing the reflected electron composition image, the reflected electron composition image before the binarization and the image after the binarization were compared with each other, and an optimum threshold value was determined for each of the reflected electron composition images of the test materials No. 1 to No. 15 such that both the images visually matched each other the most.

(Method for Measuring Thickness of Cu—Sn Alloy Coating Layer Exposed on Material Surface)

The cross section of the test material processed by a microtome method was observed with the SEM (scanning electron microscope) at a magnification of 10,000 times. Using the obtained reflected electron composition image, the minimum value of the thickness of the Cu—Sn alloy coating layer exposed on the material surface was actually measured and determined. At the same time, the presence or absence of the Cu coating layer remaining after the reflow treatment was confirmed, but the presence of the Cu coating layer was not confirmed in any of the test materials No. 1 to No. 15.

(Method for Measuring Average Spacing Between Regions A)

By using the SEM reflected electron composition image (after the binarization) obtained at a magnification of 100 times by the area ratio measurement method for the region A, a straight line was drawn on the image of the material surface, and then the average width (length along the straight line) of the region A crossing the straight line (region where the part (region C) covered with the Sn coating layer and the part (region D) with the Cu—Sn alloy coating layer exposed thereon coexist) and the average width of the region B (region excluding the region A) were determined. Subsequently, the sum of these two values was determined for each sampling, and an average of these sums was determined to be the average spacing between the regions A. The measurement direction (the direction of the drawn straight line) was set to a direction perpendicular to the rolling or polishing direction at which the surface roughening treatment was performed.

The obtained test materials were subjected to measurement tests of the coefficient of dynamic friction and the solder wettability in the following manner. The measurement results are shown in Table 1.

(Method for Measuring the Coefficient of Dynamic Friction)

Figure 5:
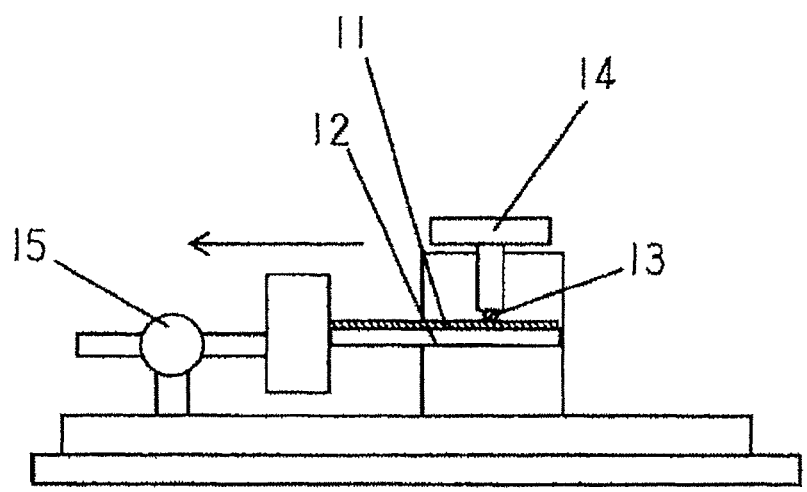
FIG. 5 is a schematic diagram of a friction coefficient measurement device.

The coefficient of dynamic friction of each test material was measured using a device shown in FIG. 5 by simulating the shape of an indent portion at an electrical contact in a fitting-type connection component. First, a male test piece 11 of a plate material cut from each test material was fixed to a horizontal base 12, and a female test piece 13 of a hemispherical work material (having an outer diameter of φ1.8 mm) cut from the test material No. 15 (without any Cu—Sn alloy layer exposed on the surface thereof) was placed on the male test piece 11, so that the surfaces of the male test piece and the female test piece were brought into contact with each other. Subsequently, a load (weight 14) of 5.0 N was applied to the female test piece 13 to press the male test piece 11, and then the male test piece 11 was pulled horizontally (at a sliding velocity set to 80 mm per minute) using a lateral load measuring instrument, thereby measuring the maximum friction force F (in units of N) up to a sliding distance of 5 mm. The coefficient of friction was determined by the following equation (1). The lateral load measuring instrument was Model-2152 (trade name) manufactured by Aikoh Engineering Co., Ltd. Reference numeral 15 denotes a load cell, and the arrow indicates a sliding direction. The sliding direction is set in a direction perpendicular to the rolling direction.

$$\text{Coefficient of friction} = F/5.0 \quad (1)$$

(Lead-Free Solder Wetting Test)

After the rosin-based inert flux was dip-applied to the test pieces cut out from each test material for one second, the zero cross time (wetting time) and the maximum wetting stress of the test piece were measured by a meniscograph method. The test conditions were set as follows: the solder bath composition of Sn-3.0Ag-0.5Cu; the solder bath temperature of 255° C.; the immersion rate of the test piece of 25 mm per second; the immersion depth of 12 mm; and the immersion time of 5.0 sec.

TABLE 1

| | Reflow conditions | | Average thickness of coating layer | | | Cu—Sn alloy coating layer | |
|---|---|---|---|---|---|---|---|
| No. | Atmosphere $O_2$ concentration % | Heating condition ° C. × sec | Underlayer ** μm | Cu—Sn alloy layer μm | Sn layer μm | Cu content % | Area ratio of region A % |
| 1 | 15 | 280 × 12 | Ni: 0.4 | 0.45 | 0.50 | 55 | 15 |
| 2 | 20 | 280 × 10 | — | 0.40 | 0.45 | 55 | 18 |
| 3 | 10 | 350 × 15 | Ni: 0.3 | 0.62 | 1.20 | 55 | 35 |
| 4 | 22 | 300 × 12 | Ni: 0.5 | 0.53 | 0.50 | 55 | 30 |
| 5 | 12 | 300 × 16 | Ni: 1.5 | 0.80 | 0.60 | 55 | 55 |
| 6 | 18 | 300 × 20 | — | 0.60 | 0.35 | 55 | 60 |
| 7 | 25 | 280 × 8 | Ni: 0.3 Fe: 0.3 | 0.35 | 0.60 | 55 | 34 |
| 8 | 10 | 350 × 20 | Ni: 0.3 Co: 0.2 | 0.90 | 1.50 | 55 | 12 |
| 9 | 10 | 300 × 14 | Ni: 0.4 | 0.60 | 0.70 | 55 | 50 |
| 10 | 20 | 280 × 10 | Ni: 0.4 | 0.40 | 0.60 | 55 | 20 |
| 11 | 30 | 280 × 25 | Ni: 0.7 | 1.00 | 0.70 | 55 | 30 |
| 12 | 5 | 280 × 15 | Ni: 0.5 | 0.60 | 1.20 | 55 | 10 |
| 13 | 20 | 280 × 12 | Ni: 0.6 | 0.50 | 0.70 | 55 | 70* |
| 14 | 20 | 280 × 8 | Ni: 0.4 | 0.35 | 0.55 | 55 | 0* |
| 15 | 20 | 280 × 10 | — | 0.40 | 0.70 | 55 | 0* |

| | Cu—Sn alloy coating layer | | | Material surface | Properties of material | | |
|---|---|---|---|---|---|---|---|
| No. | Area ratio of region C % | Thickness of exposed part μm | Spacing between adjacent regions A mm | Arithmetic average roughness Ra μm | Coefficient of friction | Solder wettability Wetting time sec | Wetting force mN |
| 1 | 55 | 0.40 | 0.26 | 0.30 | 0.26 | 1.6 | 8.0 |
| 2 | 30 | 0.24 | 0.20 | 0.17 | 0.24 | 1.8 | 6.4 |
| 3 | 65 | 0.50 | 0.13 | 0.23 | 0.24 | 1.7 | 6.5 |
| 4 | 20 | 0.42 | 0.15 | 0.16 | 0.22 | 1.8 | 6.0 |
| 5 | 50 | 0.70 | 0.16 | 0.70 | 0.21 | 1.7 | 6.5 |
| 6 | 30 | 0.54 | 0.19 | 0.81 | 0.20 | 1.9 | 5.5 |
| 7 | 30 | 0.33 | 0.25 | 0.45 | 0.21 | 1.8 | 5.8 |
| 8 | 70 | 0.79 | 0.40 | 0.19 | 0.27 | 1.4 | 10.0 |
| 9 | 60 | 0.50 | 0.32 | 1.30 | 0.20 | 1.6 | 7.0 |
| 10 | 0* | 0.33 | 0.31 | 0.34 | 0.20 | 3.0 | 4.0 |
| 11 | 10* | 0.65 | 0.22 | 0.56 | 0.24 | 2.2 | 4.8 |
| 12 | 80* | 0.50 | 0.31 | 0.20 | 0.30 | 1.4 | 8.5 |
| 13 | 25 | 0.42 | 0.25 | 2.20 | 0.20 | 2.8 | 4.5 |
| 14 | — | — | — | 0.10 | 0.45 | 1.3 | 10.0 |
| 15 | — | — | — | 0.07 | 0.50 | 1.2 | 11.0 |

*Item deviated from the specified range of the present invention
** Ni layer positioned on the base material side when the underlayer has a two-layered structure As shown in Table 1, all test materials No. 1 to No. 9 were set within the specified ranges of the present disclosure regarding the average thickness of each coating layer, the Cu content of the Cu—Sn alloy coating layer, the arithmetic mean roughness Ra of the material surface, and additionally the area ratios of the region A and the region C. Consequently, each of these test materials No. 1 to No. 9 had a low coefficient of friction and good solder wettability.

Meanwhile, the test material No. 10 had zero of the area ratio of the region C, and the test material No. 11 had a smaller area ratio of the region C, compared to the specified range of the present disclosure. Consequently, these test materials No. 10 and No. 11 were inferior in the solder wettability, compared to the test materials No. 1 to No. 9. It is noted that in the test material No. 11, the reason why the area ratio of the region C did not reach the specified range of the present disclosure is supposed to be that a thick oxide film was formed on the exposed surface of the Cu—Sn alloy coating layer because of a high $O_2$ concentration in the furnace atmosphere of the reflow treatment. The test material No. 12 in which the area ratio of the region C was larger than that specified by the present disclosure had a high coefficient of friction, compared to the test materials No. 1 to No. 9. It is noted that in the test material No. 12, the reason why the area ratio of the region C exceeded the specified range of the present disclosure is supposed to be that an oxide film having a required thickness was not formed on the exposed surface of the Cu—Sn alloy coating layer because of an extremely low $O_2$ concentration in the furnace atmosphere of the reflow treatment.

The test material No. 13 in which the area ratio of the region A was larger than that specified by the present disclosure was inferior in the solder wettability, compared to the test materials No. 1 to No. 9.

Each of the test materials No. 14 and 15 in which the area ratio of the region A was zero (the Sn coating layer covered the entire material surface) had a very large coefficient of friction, compared to the test material No. 12.

The disclosure of the present specification includes the following aspects.

First Aspect:

An electrically conductive material for a connection component, including:

coating layers including a Cu—Sn alloy coating layer and a Sn coating layer that are formed in sequence on a surface of a base material made of a copper or copper alloy sheet strip, wherein a Cu content in the Cu—Sn alloy coating layer is 55 to 70 at %, an average thickness of the Cu—Sn alloy coating layer is 0.1 to 3.0 µm, an average thickness of the Sn coating layer is 0.2 to 5.0 µm, and a material surface of the electrically conductive material has an arithmetic mean roughness Ra in at least one direction of 0.15 µm or more and an arithmetic mean roughness Ra in all directions of 3.0 µm or less, and wherein when a reflected electron image of the material surface is observed with a scanning electron microscope at a magnification of 100 times, a region A and a region B having a higher brightness than the region A and in which the Cu—Sn alloy coating layer is not exposed coexist on the material surface, and an area ratio of the region A on the material surface is 2 to 65%, and wherein when the region A is observed with the scanning electron microscope at a magnification of 10,000 times, a region C covered with the Sn coating layer and a region D not covered with the Sn coating layer coexist in the region A, and an area ratio of the region C in the region A is 20 to 70%.

Second Aspect:

The electrically conductive material for a connection component according to the first aspect, wherein an average spacing between the regions A on the material surface is 0.01 to 0.5 mm.

Third Aspect:

The electrically conductive material for a connection component according to the first or second aspect, wherein a thickness of the Cu—Sn alloy coating layer in the region A is 0.2 µm or more.

Fourth Aspect:

The electrically conductive material for a connection component according to any one of the first to third aspects, further including a Cu coating layer disposed between the surface of the base material and the Cu—Sn alloy coating layer.

Fifth Aspect:

The electrically conductive material for a connection component according to any one of the first to third aspects, further including an underlayer disposed between the surface of the base material and the Cu—Sn alloy coating layer, the underlayer being made of one or two layers selected from a Ni coating layer, a Co coating layer, and a Fe coating layer, an average thickness of the underlayer being 0.1 to 3.0 µm.

Sixth Aspect:

The electrically conductive material for a connection component according to the fifth aspect, further including a Cu coating layer disposed between the underlayer and the Cu—Sn alloy coating layer.

Seventh Aspect

A fitting-type terminal produced using the electrically conductive material for a connection component according to any one of the first to sixth aspects.

Eighth Aspect

A fitting-type connector using the fitting-type terminal according to the seventh aspect.

This application claims priority based on Japanese Patent Application No. 2015-252617 filed on Dec. 24, 2015, the disclosure of which is incorporated by reference herein.

DESCRIPTION OF REFERENCE NUMERALS

1 Base material
5 Cu—Sn alloy coating layer
6, 6a Sn coating layer
7 Ni coating layer
8 Sn plating layer

The invention claimed is:

1. An electrically conductive material, comprising:
coating layers comprising a Cu—Sn alloy coating layer and a Sn coating layer that is formed in sequence on a surface of a base material made of a copper or copper alloy sheet strip,
wherein a Cu content in the Cu—Sn alloy coating layer is from 55 to 70 atomic %,
an average thickness of the Cu—Sn alloy coating layer is from 0.1 to 3.0 µm,
an average thickness of the Sn coating layer is from 0.2 to 5.0 µm, and
a material surface of the electrically conductive material has an arithmetic mean roughness Ra in at least one direction of 0.15 µm or more and an arithmetic mean roughness Ra in all directions of 3.0 µm or less, and wherein when a reflected electron image of the material surface is observed with a scanning electron microscope at a magnification of 100 times, a region A and a region B having a higher brightness than the region A and in which the Cu—Sn alloy coating layer is not exposed coexist on the material surface, and an area ratio of the region A on the material surface is from 2 to 65%, and wherein when the region A is observed with the scanning electron microscope at a magnification of 10,000 times, a region C covered with the Sn coating layer and a region D not covered with the Sn coating layer coexist in the region A, and an area ratio of the region C in the region A is from 20 to 70%.

2. The electrically conductive material according to claim 1,
wherein an average spacing between the regions A on the material surface is from 0.01 to 0.5 mm.

3. The electrically conductive material according to claim 1,
wherein a thickness of the Cu—Sn alloy coating layer in the region A is 0.2 μm or more.

4. The electrically conductive material according to claim 1, further comprising:
a Cu coating layer disposed between the surface of the base material and the Cu—Sn alloy coating layer.

5. The electrically conductive material according to claim 1, further comprising:
an underlayer disposed between the surface of the base material and the Cu—Sn alloy coating layer,
wherein the underlayer is made of one or two layers selected from a group consisting of a Ni coating layer, a Co coating layer, and a Fe coating layer, and
an average thickness of the underlayer is from 0.1 to 3.0 μm.

6. The electrically conductive material according to claim 2, further comprising:
an underlayer disposed between the surface of the base material and the Cu—Sn alloy coating layer,
wherein the underlayer is made of one or two layers selected from a group consisting of a Ni coating layer, a Co coating layer and a Fe coating layer, and
an average thickness of the underlayer is from 0.1 to 3.0 μm.

7. The electrically conductive material according to claim 3, further comprising:
an underlayer disposed between the surface of the base material and the Cu—Sn alloy coating layer,
wherein the underlayer is made of one or two layers selected from a group consisting of a Ni coating layer, a Co coating layer, and a Fe coating layer, and
an average thickness of the underlayer is from 0.1 to 3.0 μm.

8. The electrically conductive material according to claim 5, further comprising:
a Cu coating layer disposed between the underlayer and the Cu—Sn alloy coating layer.

9. A terminal, comprising:
the electrically conductive material according to claim 1.

10. A connector, comprising:
the terminal according to claim 9.

11. A terminal, comprising:
the electrically conductive material according to claim 2.

12. A terminal, comprising:
the electrically conductive material according to claim 3.

13. A connector, comprising:
the terminal according to claim 10.

14. A connector, comprising:
the terminal according to claim 11.

* * * * *

UNITED STATES PATENT AND TRADEMARK OFFICE
CERTIFICATE OF CORRECTION

PATENT NO. : 10,597,792 B2
APPLICATION NO. : 16/064724
DATED : March 24, 2020
INVENTOR(S) : Masahiro Tsuru et al.

Page 1 of 1

It is certified that error appears in the above-identified patent and that said Letters Patent is hereby corrected as shown below:

On the Title Page

Item (86), the PCT Filed information is incorrect. Item (86) should read:
-- (86) PCT No: PCT/JP2016/088071
   § 371 (c) (1),
   (2) Date: Dec. 21, 2016 --

Signed and Sealed this
Eighth Day of December, 2020

Andrei Iancu
*Director of the United States Patent and Trademark Office*